US011782255B2

(12) United States Patent
Capelli et al.

(10) Patent No.: US 11,782,255 B2
(45) Date of Patent: Oct. 10, 2023

(54) VISUALIZATION DEVICE FOR TRANSFERRING IMAGES OF A MICROSCOPY DEVICE

(71) Applicant: BHS Technologies GmbH, Innsbruck (AT)

(72) Inventors: Mark Capelli, Innsbruck (AT); Gregor Burger, Völs (AT); Michael Santek, Goetzens (AT); Markus Friedrich Hütter, Zirl (AT)

(73) Assignee: BHS TECHNOLOGIES GMBH, Innsbruck (AT)

( * ) Notice: Subject to any disclaimer, the term of this patent is extended or adjusted under 35 U.S.C. 154(b) by 0 days.

(21) Appl. No.: 16/496,838

(22) PCT Filed: Mar. 23, 2018

(86) PCT No.: PCT/AT2018/000015
§ 371 (c)(1),
(2) Date: Sep. 23, 2019

(87) PCT Pub. No.: WO2018/170522
PCT Pub. Date: Sep. 27, 2018

(65) Prior Publication Data
US 2020/0333578 A1 Oct. 22, 2020

(30) Foreign Application Priority Data
Mar. 24, 2017 (AT) .................................. 50240/2017

(51) Int. Cl.
*G02B 21/36* (2006.01)
*G02B 27/01* (2006.01)

(52) U.S. Cl.
CPC ......... *G02B 21/368* (2013.01); *G02B 21/362* (2013.01); *G02B 27/0176* (2013.01);
(Continued)

(58) Field of Classification Search
USPC .......................................................... 348/79
See application file for complete search history.

(56) References Cited

U.S. PATENT DOCUMENTS 10,860,100 B2\* 12/2020 Osterhout ............... G06F 1/163
2006/0119539 A1 6/2006 Kato et al.
(Continued)

FOREIGN PATENT DOCUMENTS

DE 102006001515 A1 7/2007
ES 1068414 U 10/2008
(Continued)

OTHER PUBLICATIONS

Kevin Caron, "A Better Welding Helmet?—Kevin Caron," YouTube, https://www.youtube.com/watch?v=SSgBSx4GjGc, Jun. 5, 2013.\*
(Continued)

*Primary Examiner* — Michael J Hess
(74) *Attorney, Agent, or Firm* — BURNS & LEVINSON LLP; Alexander J. Smolenski

(57) ABSTRACT

The invention relates to a visualization device (1), in particular a virtual reality (VR) headset or head mounted display (HMD) for transferring images of a microscopy device (100), comprising: a supporting device (2) for arranging the visualization device (1) on the head of a user, at least one mounting device (3) for mounting at least one optical display device (4) about a point of rotation on the supporting device (2), wherein there is at least one drive device (5) via which the at least one optical display device (4) on the at least one mounting device (3) is movable between an operating position (B) and a rest position (R), such that the at least one optical display device (4) can be fixed, in the operating position (B), in the field of view of the user and, in the rest position (R), outside of the field of view of the user, wherein the drive device (5) is attached in a region
(Continued)

Figure 1:
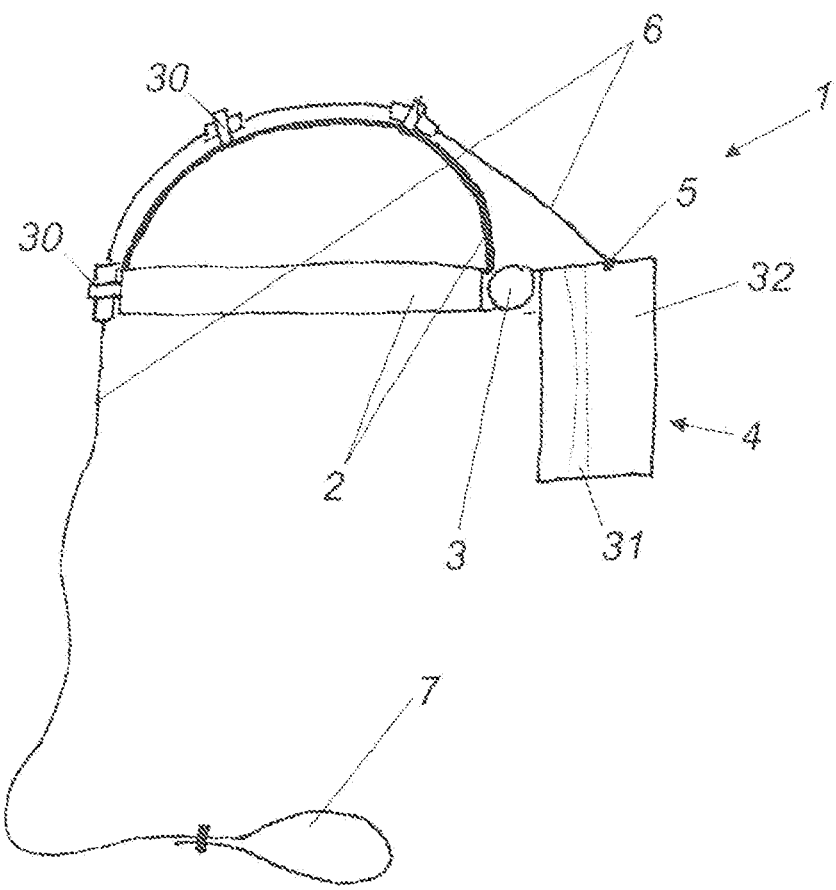

outside of the point of rotation of the mounting device (3) on the at least one display device (4).

26 Claims, 5 Drawing Sheets

(52) U.S. Cl.
CPC .. *G02B 27/0179* (2013.01); *G02B 2027/0163* (2013.01); *G02B 2027/0178* (2013.01); *G02B 2027/0181* (2013.01)

(56) References Cited

U.S. PATENT DOCUMENTS

| | | | |
|---|---|---|---|
| 2008/0180521 A1 | 7/2008 | Ahearn | |
| 2008/0309587 A1 | 12/2008 | Myake et al. | |
| 2012/0317706 A1* | 12/2012 | Lebel | A42B 3/04 2/422 |
| 2014/0260939 A1* | 9/2014 | Neal | F41H 5/0457 89/36.02 |
| 2014/0340424 A1 | 11/2014 | Ellsworth | |
| 2015/0040292 A1* | 2/2015 | Koh | A42B 1/0184 2/195.7 |
| 2015/0173846 A1* | 6/2015 | Schneider | G02B 27/017 600/424 |
| 2015/0264992 A1* | 9/2015 | Happel | A42B 3/04 2/422 |
| 2016/0004085 A1* | 1/2016 | Stroetmann | G02B 27/017 345/8 |
| 2016/0062457 A1* | 3/2016 | Kobayashi | G06F 1/163 345/156 |
| 2016/0070109 A1* | 3/2016 | Mullins | G02B 27/0176 359/630 |
| 2016/0225192 A1 | 8/2016 | Jones et al. | |
| 2017/0344107 A1* | 11/2017 | Aghara | G02B 27/0179 |
| 2018/0024369 A1* | 1/2018 | Kato | G02C 11/10 359/13 |
| 2018/0110581 A1* | 4/2018 | Kamata | G02B 21/362 |
| 2018/0261146 A1* | 9/2018 | Van 'T Hooft et al. | G01R 33/283 |
| 2019/0212521 A1* | 7/2019 | Yu | H04R 1/1008 |

FOREIGN PATENT DOCUMENTS

| | | |
|---|---|---|
| JP | 201468184 A | 4/2014 |
| TL | 2017192996 A2 | 11/2017 |

OTHER PUBLICATIONS

International Searching Authority—International Search Report, International Application No. PCT/AT2018/000015 dated Jul. 5, 2018, together with the Written Opinion of the International Searching Authority, 14 pages (With partial translation of ISR).

\* cited by examiner

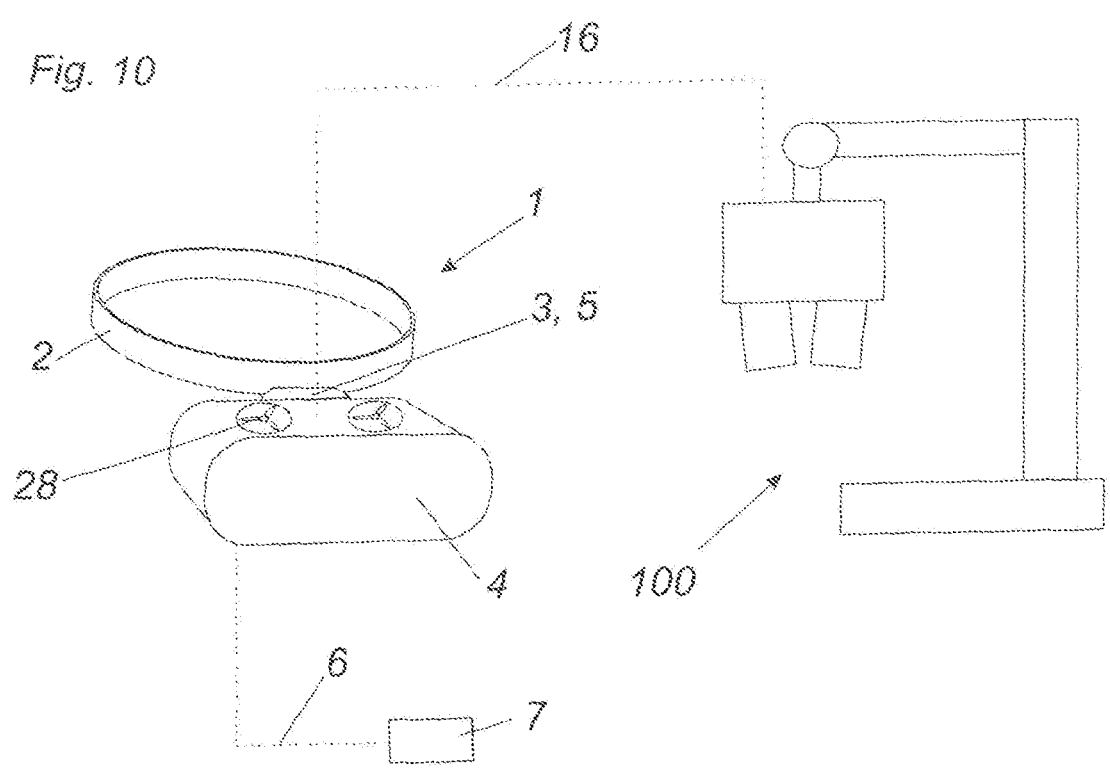

VISUALIZATION DEVICE FOR TRANSFERRING IMAGES OF A MICROSCOPY DEVICE

CROSS-REFERENCE TO RELATED APPLICATIONS

This application is a U.S. national phase entry under 35 USC § 371 of Patent Cooperation Treaty Application No. PCT/AT2018/000015 filed Mar. 23, 2018, which in claims priority from Austrian Patent Application A 50240/2017 filed Mar. 24, 2017, the disclosures of which are incorporated herein by reference in their entirety.

The invention concerns a visualization apparatus with the characteristics of the superordinate concept of claim 1.

Furthermore, a microscopy device with a visualization device according to the invention is described.

In addition, the use of a visualization device with a microscopy device shall be described.

Visualization devices of the type mentioned at the outset are already part of the prior art and are shown, for example, in US 2018/02251 2 A of WO 95 1 1 473 A1, WO 02 086 580 A1 and US 2018 181 746 A1. Such visualization devices allow image data obtained in the course of a medical surgery or examination to be transmitted to the visualization device. Particularly so-called Virtual Reacty glasses (VR glasses) or Head Mounted-Displays (HMD) play an essential role. These allow the user—such as the surgeon or doctor—optimal visualization of the image data from the microscopy device during a surgery or examination.

The state of the art also shows that such visualization devices can be adapted to the user or wearer; anatomical characteristics of the wearer as well as, for example, visual impairments can be compensated by various adjustment options. Nevertheless, there is the problem that during a surgery or examination the visualization device cannot be automated and completely move out of the user's field of view. Particularly in the case of a tiring activity, complicated surgery or examination, there is depending on the user multiple times the need, to release the field of view for a short period of time in order to maintain a clear view and to be able to relieve stress. This would contribute to the well-being of the user and can in between also give him a panoramic view, which might be useful for organizing a surgery or an examination. For example, in the course of a surgery or examination, the view to the auxiliary staff, the required instruments or the patient as a whole is released. However, since the user must always have sterile hands throughout the surgery or examination, the user cannot simply touch and adjust the visualization device or move it out of user's field of view. The visualization device must therefore be moved by auxiliary personnel or sterilized after touching it. In addition, touching the visualization device also causes the visualization device to become unsterile. The visualization device cannot simply be cleaned because it often comprises sensitive electronic or mechanical components. The complex design of such a visualization device makes it difficult to achieve sufficient sterility.

Packaging the visualization device to keep it sterile is also time-consuming, and the package is also contaminated by every touch of the user, so the package would have to be changed after the touch. In general, the visualization devices, in particular virtual reality glasses or head-mounted displays, when used in the operating room or in the course of a medical examination, exhibit precisely these problems with regard to sterility and wearing comfort. The user is burdened by the constant wear and tear and the reduced field of view caused by the visualization device. Opening the field of view on demand is difficult due to the need for sterility.

It is an objective of the invention to avoid the aforementioned disadvantages and to describe an improved visualization device compared to the state of the art. This is achieved with the visualization device according claim 1, for the microscope device according to claim 19 for use of the microscope device according to the features of claim 20.

If at least one drive device is provided by means of which the at least one optical display device can be moved on the at least one bearing device between an operating position and a rest position, so that the at least one optical display device can be fixable in the operating position in the field of view of the user and in the rest position outside the field of view of the user, for example in order to obtain a better all-round view or to prevent tiring. The constant wearing of the visualization device puts strain on the user and moving the at least one optical display device to a rest position relieves the user.

The use of at least one drive device also makes it possible for the at least one optical display device to be automatically removed from the user's field of view and returned to the user's field of view—the movement between the operating position and the resting position therefore does not have to be carried out actively by the user directly on the visualization device, but takes place via the at least one actuating device. This not only maintains the sterility of the user's glasses and hands, but also ensures that the user's facial area does not comes into contact with contaminated body fluids or tissue when the visualization device is manually moved out of the facial area.

It turned out to be particularly advantageous that at least one actuating device can be activated by at least one control device. The control device is, so to speak, the interface between the visualization device and the user. The user can control via the command given to control device to move the at least one optical display device into the operating position or into the rest position. If the at least one control device comprises at least one actuating device, which can be used by the user to activate the drive device, easy access to the at least one control device is provided through the actuation device. By means of a plurality of different control devices or a plurality of different actuating devices, which are already known from the state of the art, the respective actuating device can be personalized to the respective control device. However, it may also be possible to couple any activation device to the control device according to the preferences of the user. An activation device can be, for example, a lever, a sensor or a switch. This increases the flexibility and adaptability of the visualization device.

If the at least one actuating device is spatially separated or spaced from the at least one drive device, a kind of remote control can be realized, which is intended to move the at least one drive device. For example, it is possible to control a visualization device worn on the user's head by means of a footswitch as an activation device. Of course, as distanced or spatial separated longer or shorter distances than the distance between the user's head and foot can be considered.

If the at least one control device is formed by a mechanical connection, an electronic connection, a hydraulic connection or a pneumatic connection between the at least one activation device and the at least one driving device, then a multiplicity of possible variants is available. This allows to realize a cost-effective visualization device, which for example can be moved between the operating position and the rest position only via a cable pull, or a more comfortable, expensive variant, in which the operating position or rest position is established by a computer control as a control device. Various variants of visualization devices can thus be produced, which is also due to the characteristic that the drive device comprises a mechanical, electrical, hydraulic or pneumatic drive. It is not necessary that an electric drive device requires an electric control device. For example, it may also be the case that an electric drive device is energized by a mechanical control device. For example, a cable pull may flip a switch on the drive device to operate it electronically or electrically. This way additional variants or possibilities of the visualization device for cost saving or to adapt to the field of application.

The at least one drive device may be formed by a part of the at least one control device. For example, when using a cable pull or pulling component, it is possible to use it as a control device and also as a drive device. If a cable pull is used as a control device, it also transfers the energy as a drive device directly to at least one drive device, which can thus be moved between the operating position and the rest position about the bearing.

Thus, a part of the control device is used as drive device. If the at least one drive device is formed by a servomotor, linear motor, servomotor or an electrically excitable magnet, the at least one drive device can be excited by an electric circuit, which has significant advantages over a mechanical system. On the one hand, the movement can be better controlled, is maintenance-free, requires no user force and is generally more flexible than a mechanical control device or drive device.

If the at least one actuating device can be activated through touching by the user, preferably by a switch, pushbutton or lever, a cost-effective variant for moving the at least one display device between the rest position and the operating position can be formed. The switch, pushbutton or lever may, for example, be designed as a foot switch, foot push button or foot lever in order to keep the hands free for the user, for example for operations or medical examinations. It also prevents the need to touch the visualization device with sterile hands.

It has proven to be particularly advantageous that at least one actuating device can be activated contact-free by the user. This means that the user does not have to "mechanically" touch the actuating device.

It is particularly advantageous, if the at least one activation device is formed by at least one sensor or is coupled to at least one sensor so that the at least one actuating device can be activated contact-free by gestures or acoustic commands from the user. A gesture-controlled actuating device has the advantage that the at least one display device of the visualization device is moved contact-free and by simple commands with a hand-gesture signal or acoustic signals between the operating position and the rest position. Through start/stop gestures it is possible not only to move into the operating position or a rest position, but also an intermediate position. For example, by means of various commands a display device covering only the right eye can be brought into the rest position or operating position—and/or a display device covering also the left eye.

If the at least one activation device comprises at least one transmitting device and the at least one driving device or the at least one control device comprises a receiving device, such that a signal transmission between the at least one activation device and the at least one driving device can be established, the arrangement of the at least one activation device relative to the at least one driving device can be freely selected in space. For example, a foot switch or also a sensor which serves as activation device can be arranged at a desired location in the operating theatre where access by the user appears to be most comfortable or most meaningful. Several activation devices can also be distributed throughout the room in order to make use even more flexible. It is also very advantageous that the signal transmission is wireless. This means that there are no cable connections between the at least one activation device and the at least one driving device or the at least one transmitting device and the at least one receiving device. The problem with cables distributed throughout the room is that they can lead to accidents and the cable can also be severed or damaged, leading to system failure. Furthermore, a cable on the visualization device restricts the user's freedom of movement.

If the at least one display device is moved about the at least one bearing device, it can be moved out of the field of view. If the at least one display device is mounted movably along a guide device on the at least one bearing device, the display device can be moved out of the field of view along this guide device and back into the field of view. The rotating or moving out of the field of view and back should be chosen in such a way that the center of gravity of the visualization device does not change too much during the movement between the positions or also in the different positions. Wearing the visualization device on the user's head makes it very uncomfortable if the visualization device becomes top-heavy when the at least one display device moves out far and wide and, for example, pushes the user into his forehead or threatens to fall off his head. The wearing comfort and secure hold of the visualization device on the user's head should not be adversely affected by the movement of the at least one display device between the operating position and the rest position.

If the at least one bearing device is formed by the at least one drive device, components are saved. For example, one servomotor or control motor can simultaneously take over not only the movement but also the bearing of the at least one display device. Thus, costs are saved, the weight of the visualization device is reduced, and the size of the visualization device is also reduced. The more compact and lighter design contributes significantly to the convenience of the visualization device. In addition, the surfaces are smaller and closed, which has a positive effect when the visualization device is cleaned. If at least one display device is equipped with a transparent, partially transparent or opaque screen, preferably an OLED screen, then a state-of-the-art visualization device is formed, of which at least one display device is also moved out of the user's field of view by activating a drive device.

According to a further design example, at least one air-conditioning device—preferably in the form of a fan—is arranged on the visualization device. With this air-conditioning device it is possible to create a pleasant climate for the user in the area of the visualization device or beyond. For example, if the visualization device covers a large area of the user's face, a temperature jam occurs in this area of the face. This can often be very uncomfortable, which increases the need to remove the visualization device. Not only moving it out of the field of view—as described above—contributes to the wearing comfort, but also an air-conditioning device. This air-conditioning device can, for example, blow the ambient air into the carrying area of the visualization device, preferably via a fan. In addition, a cooling device can also be used to additionally cool the air flow.

Figure 5:
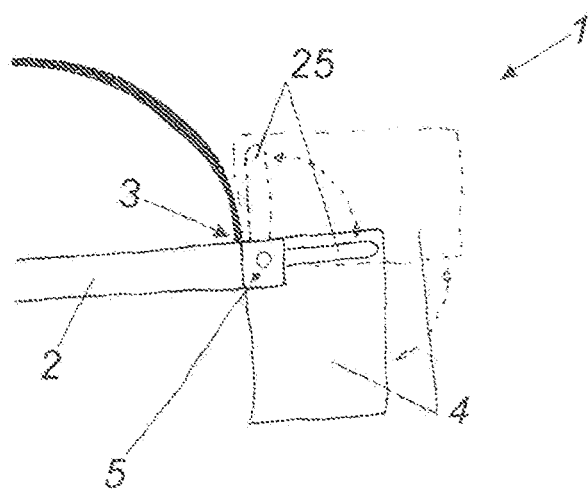
Figure 6:
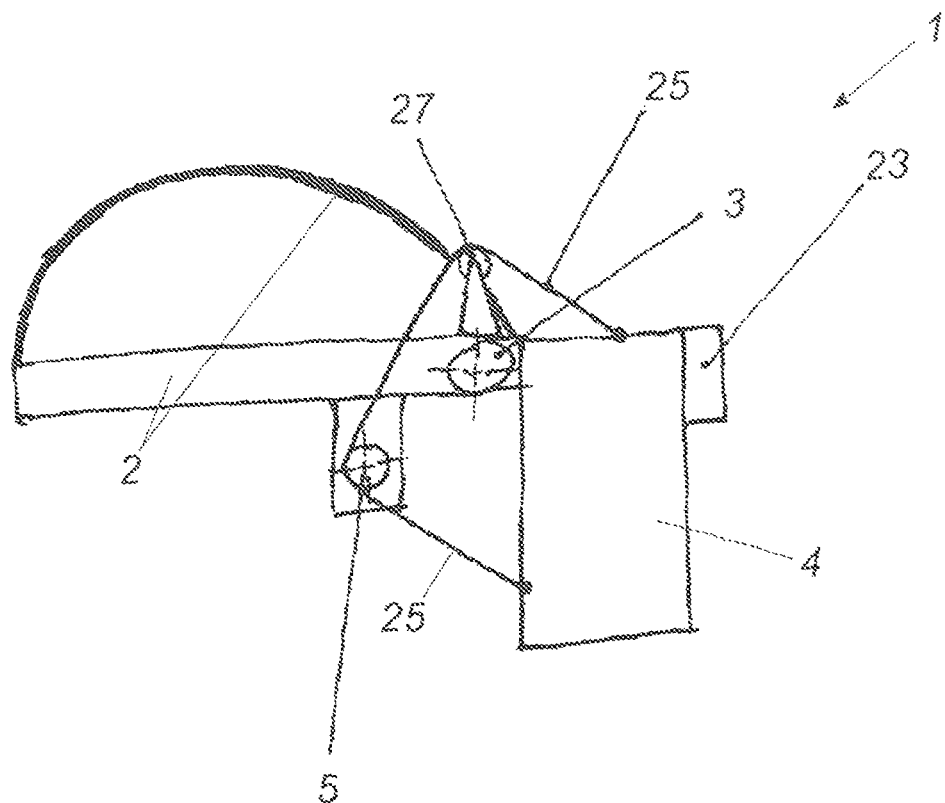
Figure 7:
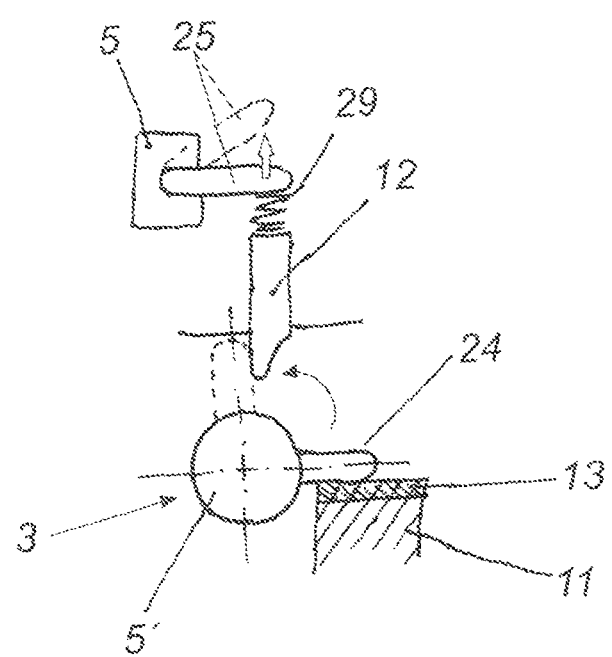
Figure 8A:
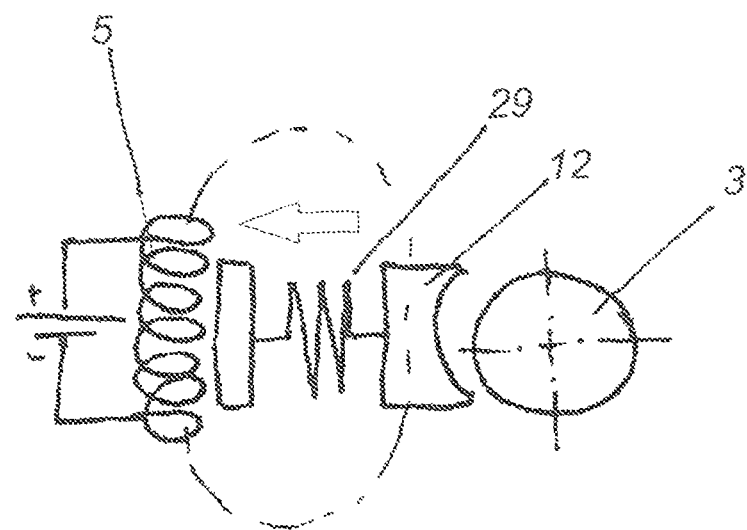
Figure 8B:
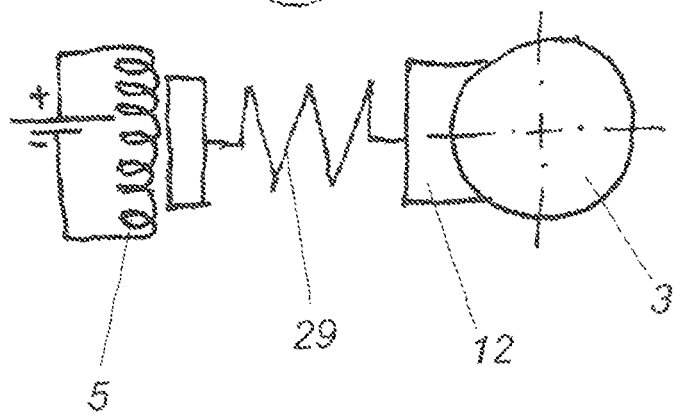
Figure 9:
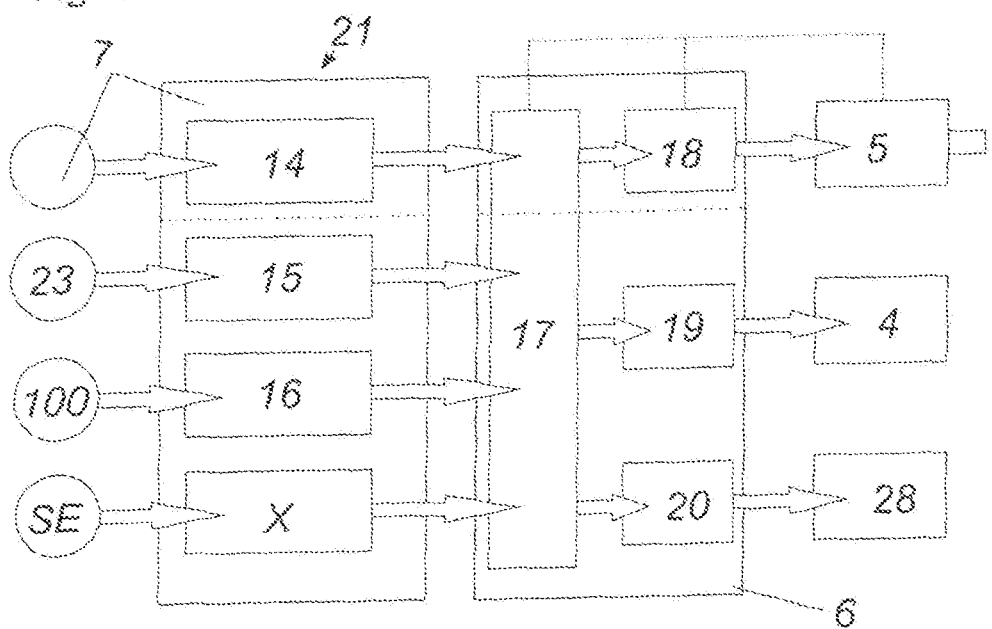

Further details and advantages of the present invention are explained in more detail below on the basis of the figure description with reference to the examples shown in the drawings. They show:

FIG. 1-FIG. 6 various guide and drive devices,
FIG. 7 variant of a latching device,
FIG. 8a, 8b electromagnetic variant of a latching device,
FIG. 9 block diagram visualization device, and
FIG. 10 visualization device and microscopy device schematic representation.

FIG. 1 shows a visualization device 1 in operating position B. In the operating position B the at least one display device 4 is located in the field of view of the user. The at least one display device 4 comprises at least one screen 31, preferably in the form of an OLED screen and a cover 32, in order to prevent unfavorable incidence of light into the projection space of the at least one display device 4 and to protect the screen 31. The at least one display device 4 is connected to the support device 2 via at least one bearing device 3. The support device 2 is attached to the head of the user 30. This comprises, for example, straps or a helmet-like structure and can be made of both flexible and hard material. In the case of FIG. 1, the bearing device is formed as a pivot bearing with a single axis of rotation. Thus, at least one display device 4 can be moved or rotated around the pivot of the bearing device 3. This is done by control device 6, which also forms the drive device 5. The control device 6 in this case is a cable pull which is attached to at least one display device 4 at an area outside the pivot point of the bearing device 3. When pulling on the control device 6 or on the actuating device 7 arranged on the control device 6, the at least one display device 4 is brought into the rest position R in order to release the field of view of the user.

For simplification, FIG. 1 shows only one display device 4. In addition to the display device 4, a second display device 4' can also be arranged, which is controlled via a separate control device 6'. In this way, either a right or a left display device 4 can be brought into the rest position or the operating position separately or simultaneously. Thus at least one display device 4 can be provided for each eye of the user. In the case of FIG. 1, the at least one display device 4 will automatically return to the operating position B. This is accomplished by gravity. However, an adjustable or preset slipping clutch, for example, which slips when the user's head is pitched, can also be arranged in the area of bearing device 3, whereby at least one display device 4 moves back into the operating position B. The slipping clutch is then moved back into the operating position B by gravity. A resistance, such as achieved by a slipping clutch, can also be produced in the guide devices 30. For example, a certain frictional fit can be achieved there, which is overcome by the user during pitching, whereby the control device 6 slips through the at least one guide device 30 until the at least one display device 4 has reached the operating position B. The guide device 30 can also be used for the control of the at least one display device 4. Otherwise, the guiding devices 30 are only used to guide the control device 6.

Figure 2:
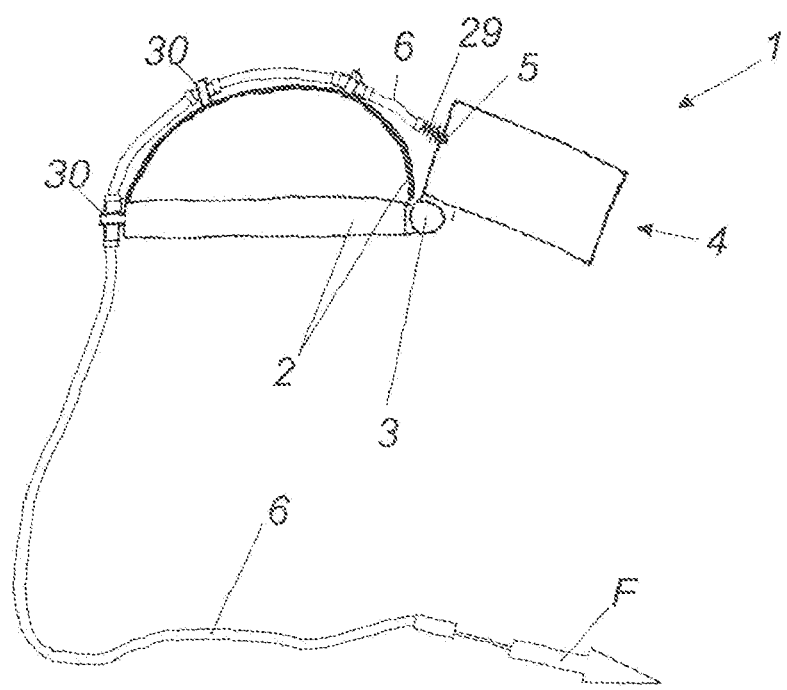

FIG. 2 shows the visualization device 1 in the rest position R. At least one display device 4 was moved in an area outside the user's field of view. In the case of FIG. 2, control device 6 is formed by a Bowden cable. The outer sheath of the Bowden cable is held in the guiding devices 30, the inner cable of the Bowden cable takes over the power transmission of the release force F, which is initiated by the actuating device 7 not shown in FIG. 2. At least one display device 4 has a force accumulator 29, for example in the form of a compression spring. This compression spring is prestressed to such an extent that a return to the operating position B of at least one display device 4 is supported. If, for example, the release force F is no longer applied, at least one display device 4 is returned to the operating position B by the energy accumulator 29. In this case, too, an unintentional movement to operating position can be prevented by means of a slipping clutch or another resistor, e.g. used in bearing device 3 or also in control device 6. Only by a nodding head movement of the user, for example, the force of the resistance is overcome—whereby also the force accumulator 29 acts supporting—and the at least one display device 4 is brought into the operating position B. The force of the resistance is also supported by the force accumulator 29. FIG. 2 shows no actuating device 7. This can be a lever, foot switch, knob, rotary handle or other device.

Figure 3:
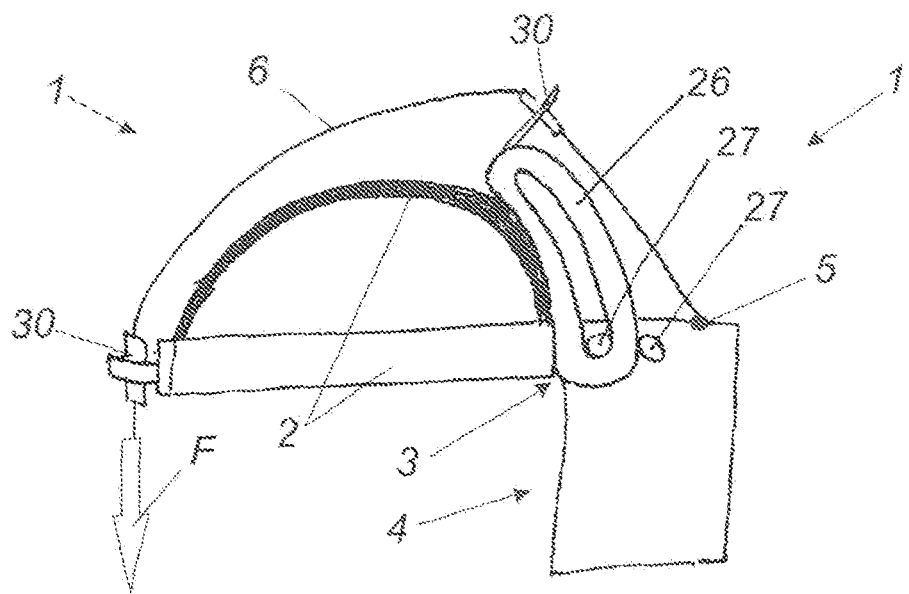

FIG. 3 shows another example of the visualization device 1. This also includes a support device 2 for arranging the visualization device 1 on the head of a user. In addition, through a cable pull, which serves as control device 6, the drive device 5 is as well formed. Via the release force F, at least one display device 4 is moved between the operating position and the rest position. A guide rail 26, preferably curved, is used for this purpose. Guide elements 27 engage in or on this guide rail 26. These provide on the one hand the necessary guidance, on the other hand also a stable mounting of the at least one display device 4. Thus, the guide rail 26 together with the guide elements 27 assumes the role of the bearing device 3. In the case of a bearing device 3, which is designed as a pivot bearing, as shown for example in FIG. 2 or FIG. 1, often the problem arises that the center of gravity is strongly changed when the at least one display device 4 rotates out of the visualization device 1. Thus, the wearing comfort of the visualization device 1 can deteriorate due to the shift of the center of gravity. This problem is reduced or prevented by the curved guide rail 26, for example, since the center of gravity does not change or changes only slightly between the operating position B and the rest position R when the at least one display device 4 moves.

Figure 4:
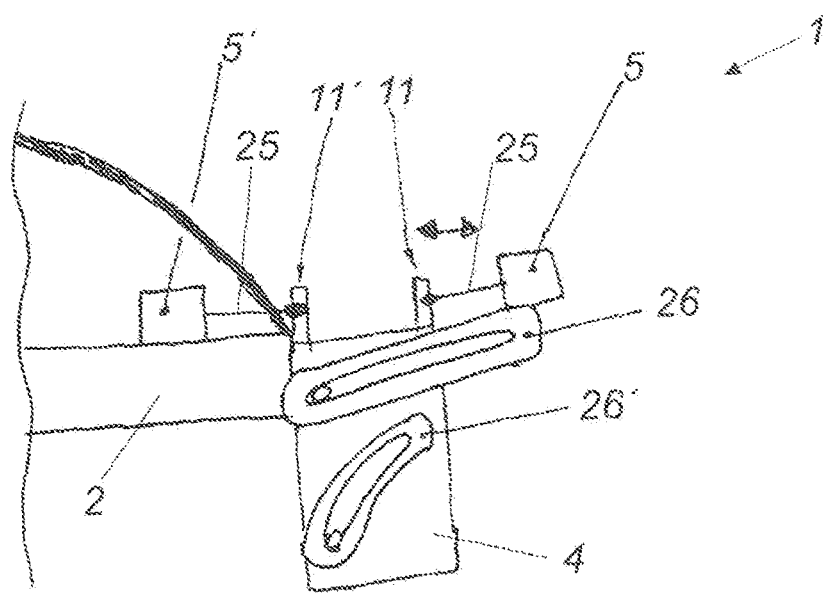

FIG. 4 shows the visualization device 1 with two drive devices 5, 5'. The drive device 5 is arranged on the guide rail 26, the second drive device 5' on the support device 2. Depending on which of the drive devices 5, 5' is powered, the at least one display device 4 is moved between the rest position R and operating position B. In this case, the drive device 5 is tilted by a tilt element 11, the drive device 5' is tilted on a tilt element 11'. The force transmission between drive device 5 and 5', as the case maybe the tilting elements 11, 11' is carrier out through force transmission means 25, for example through rods, ropes or pistons. By two different guide rails 26, 26' not only a swiveling but also a shifting of at least one display device 4 can be carried out.

FIG. 5 shows a further version of the visualization device 1. The at least one bearing device 3, to which the at least one display device 4 is attached, is formed by the at least one drive device 5. The at least one drive device 5 is firmly connected to the support device 2. The at least one display device 4 is mounted directly via a power transmission device 25, for example by a lever of a server motor, and is thus moved upon excitation of the at least one drive device 5. In the case of FIG. 5, drive device 5 can be formed by a servo motor, a mechanical solution, for example via a deflection lever controlled by a cable pull.

FIG. 6 shows a further version of the visualization device 1, in which the movement of at least one display device 4 is produced via a belt drive or a cable pull which serves as force transmission device 25. This force transmission device 25 at least partially encloses an axis of rotation of at least one drive device 5. If this axis of rotation is moved by the at least one drive device 5, the force transmission device 25 is moved relative to the axis of rotation, wherein the at least one display device 4 pivots between the rest position R and the operating position B. The at least one display device 4 is moved between the rest position R and the operating position B. In order to improve the transmission of force, a guide element 27 can be provided, which at the same time take over the function to span the transmission device 25. This example also shows how at least one additional camera 23 is arranged on at least one display device 4. It can acquire image data from the user's environment and transmit it directly or indirectly to at least one display device 4. Thus, not only data of the microscopy device 100 is transmitted to the display device 4, but also—switchable—data of the additional camera 23. This increases the user-friendliness of the visualization device 1, since, for example, in the case of a panoramic view during an operation or an examination, at least one display device 4 does not have to be brought into the rest position R.

FIG. 7 shows a latching device for locking the bearing device 3, which in this case is designed to be rotatable. This variant shows two drive devices 5, 5'. A drive device 5 serves to open and close the locking device 12, which is connected to the force transmission means 25 by an energy accumulator 29—in this case in the form of a spring. Depending on the movement caused by the drive device 5, the locking device 12 is in an open position or in a closed position. In the open position, i.e. when the locking device 12 is pulled upwards, the stop lever 24 on the shaft of the bearing device 3 or the drive device 5' can move freely back and forth between the rest position R and the operating position B. The locking device 12 is in the open position or in the closed position. The locking device 12 also has a recess which allows the stop lever 24 to engage unidirectionally and prevents the stop lever 24 from moving in the opposite direction due to its shape. This makes it possible, for example, to bring the stop lever 24 into the rest position R or operating position B by pitching the head, but not out of this position. In order to be able to perform a movement from this position, the locking device 12 must be actively controlled by the drive device 5. However, if there is an alternating, active movement of the stop lever 24 between the rest position R and the operating position B, a further drive device 5' is provided which executes this movement. The drive device 5' is thus controlled simultaneously with drive device 5. If the locking device 12 is pulled upwards by the drive device 5, the movement can take place simultaneously with the drive device 5'. Otherwise it is locked. In order to be able to absorb shocks during adjustment between the rest position R and the operating position B, a damping device 13 can be provided which is arranged on a stop element 11. This damping device 13 can, for example, be formed by an elastomer damper, a gas pressure damper or simply by a spring element.

FIGS. 8a, 8b show a locking device, designed as an electromagnetic clutch, in different positions. FIG. 8a shows the open position in which a movement of the bearing device 3 can be produced between an operating position B and a rest position R of the visualization device 1. A lock device 12 is brought into the open position via an electromagnet which serves as drive device 5. Between the locking device 12 and the drive device 5 there is an energy accumulator 29 which, when the drive device 5 is not powered, presses the locking device 12 against the bearing device 3 and thus prevents movement of the bearing device 3. In FIG. 8b, the drive device 5 is in the de-powered state. The locking device 12 blocks movements between a rest position R and an operating position B of the visualization device 1. For simplification, visualization device 1 was not shown in FIGS. 8a, 8b. However, the process was sufficiently explained in FIGS. 1 to 6. The connection between the locking device 12 and the bearing device 3 can be friction-locked or positive-locked.

FIG. 9 shows a schematic block diagram for the operation of visualization device 1. This shows four essential columns. In the first column there is the actuating device 7, the additional camera 23, the microscopy device 100 respectively and further optional switching inputs SE. These components transmit their signals to the second column of the block diagram, which can be formed on the one hand by the actuating device 7 itself—as a sensor for the data, for example of the gesture control or the acoustic control—or also by an independent module. For this reason, the area between the sensor data 14 and the external camera data 15, the microscope data 16 and the additional data X is shown dashed. The actuator 7 can be a stand-alone module, so to speak, or it can be designed as a data acquisition module 21. The sensor data 14 of the actuator 7 is transmitted to a processing unit 17, which processes the data and transmits it to the drive control means 18. The drive control means 18 then controls at least one drive device 5. A constant exchange between the at least one drive device 5 or the drive control 18 and the processing unit 17 takes place. For example, the position of the at least one drive device 5 can be permanently communicated to the control device 18 or the processing unit 17. The processing unit 17 can be used independently only for processing the data of the actuator 7 or also for the data of the other signal inputs. Thus, the processing unit 17 can process the external camera data 15, the microscope data 16 and the additional data X of additional optionally desired switching inputs SE.

The third column of the block diagram of FIG. 9 thus forms the control device 6. This contains—as described above—the processing unit 17. In addition, the processing unit 17 can also be used at the same time not only to transmit the signals to the at least one drive device 5, but also to transmit the data of the microscopy device 100 or the additional camera 23 via, for example, the image control device 19. These data are transmitted from the image control device 19 to the at least one display device 4. Additional switching inputs SE can be used, for example, to record the surface temperature of the 25 user. The humidity or ambient temperature can also be measured. This additional data X is also transmitted, for example, via the processing unit 17 to a climate control device, which subsequently regulates and controls the air-conditioning device 28.

For example, a computer that receives all data 14, 15, 16, X and passes them on to the respective appliance in the fourth column can serve as control device 6. Appliances are considered to be at least one drive device 5, at least one display device 4 and at least one air-conditioning device 28. 15 FIG. 10 shows a schematic representation of a visualization device 1 in combination with a microscopy device 100. The microscope data 16 obtained by the microscopy device 100 are transmitted to the visualization device 5 by means of data transmission (cable or wireless). It is also possible, for example, to control the microscopy device 100 via head movements or the like. The data transmission of the microscope data 16 is also used here. The actuating device 7 is connected to the visualization device 1 by the control device 6. The data can also be transmitted wirelessly or via a cable connection. FIG. 10 shows the air-conditioning device 28 in the upper area of at least one display device 4. In the case of FIG. 10, this ventilates the interior of at least one display device 4. The air-conditioning device 28 can also be arranged additionally or alone on support device 2 in order to be able to air-condition a larger area of the user or his environment. The air-conditioning device 28 may include other elements, such as temperature control elements. Cooling or heating elements may also be provided, which can be controlled with or without a fan or fan to regulate the climate.

FIG. 10 shows a schematic view of the visualization device 1 in combination with a microscopy device 100. The microscope data 16 obtained through microscopy device 100 are transmitted by data transmission (wireless or wired) to the visualization device 1. It is also possible, for example through movement of the head or similar, to control the microscopy device 100. Also in this case data transmission is used for microscope data 16. The actuating device 7 is through control device 6 connected to the visualization device 1. The transmission of data can as well be carried out via radio or a cable connection. Schematically shown is also an air-conditioning device 28 in the upper area of the at least one display device 4. It vents in case of FIG. 10 the inner room of the at least one display device 4. The air-conditioning device 28 can in addition or alone be arranged at the support device 2 for acclimatizing a larger area of the user or its environment. Air-conditioning device 28 may comprise of additional elements, for example temperature regulating elements. Further, cooling or heating elements may be provided, which can be used with or without air blower or ventilator to control climate.

The invention claimed is:

1. Visualization device, for transferring images of a microscopy device, comprising:
   a supporting device for arranging the visualization device on the head of a user,
   at least one bearing device for mounting at least one optical display device about a point of rotation on the supporting device,
      wherein there is at least one drive device via which the at least one optical display device on the at least one bearing device is rotatable about the point of rotation between an operating position and a rest position, such that the at least one optical display device can be fixed in the operating position in the field of view of the user and, in the rest position outside of the field of view of the user, characterized in that the drive device is attached in a region outside of the point of rotation of the bearing device on the at least one display device, the drive device acting on a force transmission device such that at least one optical display device rotates between the operating position and the rest position,
      wherein the visualization device further includes a locking device, an energy accumulator and a stop lever, the locking device configured to lock the bearing device by locking the stop lever and comprising an open position and a closed position, the stop lever configured to move freely back and forth between the rest position and the operating position when the locking de-vice is in the open position and to engage the locking device to lock the display device when the locking device is in the closed position, the locking device connected to a force transmission means by the energy accumulator, the force transmission means driven by a further drive device configured to open and close the locking device to move the locking device in the open position or in the closed position, and
      wherein the locking device comprises a recess having a concave shape configured to allow the stop lever to engage unidirectionally and to prevent the stop lever from moving in the opposite direction.

2. Visualization device according to claim 1, characterized in that the at least one drive device is movable by at least one control device.

3. Visualization device according to claim 2, characterized in that the at least one control device comprises at least one actuating device which can be activated by the user for adjusting the drive device.

4. Visualization device according to claim 3, characterized in that the at least one actuating device is separated or spaced apart from the at least one drive device.

5. Visualization device according to claim 3, characterized in that the at least one control device is characterized through a mechanical connection, an electric connection, a hydraulic connection or a pneumatic connection between the at least one actuating device and the at least one drive device.

6. Visualization device according to claim 1, characterized in that the at least one drive device comprises a mechanic, electric, hydraulic or pneumatic drive.

7. Visualization device according to claim 2, characterized in that the at least one drive device is part of at least one control device.

8. Visualization device according to claim 1, characterized in that the at least one drive device is formed by an actuator, a linear motor, a servo motor or an electric excitable magnet.

9. Visualization device according to claim 3, characterized in that the at least one actuating device is activatable through a touch of the user, preferable through a switch, a push-button or lever.

10. Visualization device according to claim 3, characterized in that the at least one actuating device is activatable in a contact-free manner through the user.

11. Visualization device according to claim 3, characterized in that the at least one actuating device comprises at least one sensor or at least one sensor (8) coupled such that the actuating device is activatable in a contact-free manner through gestures or acoustic commands from the user.

12. Visualization device according to claim 3, characterized in that the at least one actuating device comprises at least one transmission device and the at least one drive device or the at least one control device comprising a receiver device, such that a signal transmission between the at least one actuating device and the at least one drive device can be established.

13. Visualization device according to claim 12, characterized in that the signal transmission is wireless.

14. Visualization device according to claim 1, characterized in that the at least one display device is slewable mounted at the at least one mounting device.

15. Visualization device according to claim 1, characterized in that the at least one display device is movable along guide device, mounted at the at least one mounting device.

16. Visualization device according to claim 1, characterized in that the at least one mounting device is formed by the at least one drive device.

17. Visualization device according to claim 1, characterized in that the at least one display device is formed by a curved OLED display.

18. Visualization device according to claim 1, characterized in that the at least one air-conditioning device, preferable formed by a ventilator, is arranged at the visualization device.

19. Microscopy device with at least one visualization device according to claim 1.

20. Use of the visualization device according to claim 1 with a microscopy device according to claim 19 for medical interventions.

21. Visualization device according to claim 1, wherein the visualization device is a virtual reality (VR) headset or a head mounted display (HMD).

22. Visualization device according to claim 1, wherein the force transmission device is a belt drive or cable pull.

23. Visualization device according to claim 1, further comprising a guide element for guiding the force transmission device.

24. Visualization device according to claim 1, wherein the drive device and the further drive device are controlled simultaneously.

25. Visualization device according to claim 1, wherein the energy accumulator is in the form of a spring.

26. Visualization device according to claim 1, further comprising a damping device formed by an elastomer damper, a gas pressure damper or a spring element, arranged on a stop element and configured to absorb shocks by the stop lever during adjustment between the rest position and the operating position.

* * * * *